United States Patent Office 3,347,968
Patented Oct. 17, 1967

3,347,968
METHOD OF SEPARATING CATIONS FROM SOLUTIONS CONTAINING THE SAME AND FOR INCORPORATING CATIONS INTO BODIES OF REGENERATED CELLULOSE
Rainer Thomas and Paul Weber, Siegburg, Germany, assignors to Phrix-Werke Aktiengesellschaft, Hamburg, Germany
No Drawing. Filed June 7, 1965, Ser. No. 462,056
Claims priority, application Germany, Oct. 21, 1960, P 25,897; Oct. 20, 1961, P 28,062
14 Claims. (Cl. 264—195)

The present application is a continuation-in-part of our copending application Serial No. 232,344, filed October 18, 1962, now abandoned, and entitled "Method for Separating Cations from Solutions Containing the Same." Application Serial No. 232,344 is a continuation-in-part of our application Serial No. 146,341, filed October 19, 1961, entitled "Method of Forming Shaped Bodies of Regenerated Cellulose," now abandoned.

The present invention relates to a method of producing metal sulfide-containing bodies of regenerated cellulose and of other materials capable of swelling in water.

The present invention is also concerned with an improvement in the process of making fibrous and sheet or foil-like bodies of regenerated cellulose from viscose, and with the separation of certain cations from aqueous solutions thereof.

It has been proposed to use zinc sulfide for separating metals from dilute solutions thereof by introducing zinc sulfide into such solutions, whereby the sulfide of the initially dissolved metal will precipitate and the corresponding zinc salt will go into solution. This so-called "zinc sulfide filter method" will permit at least partly to separate in a zinc sulfide column different metals at spaced levels of the zinc sulfide column in the form of differently colored zones.

It is one of the difficulties and disadvantages of the zinc sulfide column filter method that the particle size of the zinc sulfide must be adjusted to the speed of passage of the solution through the zinc sulfide column. A speed of passage sufficiently fast for practical purposes will cause a rather slow or reduced speed of reaction, due to the fact that the speed of a heterogeneous reaction depends partly on the particle size of the solid phase. In other words, if the particle size of the zinc sulfide particles is sufficiently great to allow for a fast flow of the solution through the column, then the zinc sulfide surface which will come in contact with the solution will be rather small as compared with the zinc sulfide surface that would be available if the size of the individual zinc sulfide particle would be considerably reduced. However, the flow of the solution through such zinc sulfide particles of reduced size would be greatly retarded.

It is, therefore, an object of the present invention to overcome the above discussed difficulties and disadvantages.

It is a further object of the present invention to provide a simple and effective method for separating certain dissolved cations from aqueous solutions thereof.

Viscose, i.e., the viscous solution including cellulose xanthate and dilute caustic soda which is then extruded in suitable manner, contains alkali metal sulfide and alkali metal polysulfides. When it is attempted to introduce into the viscose a water soluble salt of a metal forming a water insoluble or difficultly soluble sulfide, then the sulfide of such metal is formed in the solution, due to the presence of alkali sulfide and alkali polysulfide therein, and the thus-formed metal sulfide will precipitate and thus separate from the solution in a quickly agglomerating difficultly filterable form. Only the salts of metals forming sulfides which are soluble in alkaline solutions, such as tin, antimony and arsenic will not be precipitated in this manner.

It is, therefore, another object of the present invention to provide a method for producing shaped bodies of regenerated cellulose by the viscose process, which bodies will contain distributed therethrough a metal or the sulfide of a metal, particularly a metal of the type first mentioned above, i.e. a metal forming a sulfide which is difficultly soluble and which when formed in the viscose prior to extrusion of the same would tend to precipitate and to form difficultly filterable agglomerations in the viscose.

It is yet a further object of the present invention to provide a method for producing shaped bodies of regenerated cellulose which contain substantially evenly distributed therethrough one or more of the metals or metal sulfides which would not stay finely distributed in the viscose mass prior to spinning of the same.

Other objects and advantages of the present invention will become apparent from a further reading of the description and of the appended claims.

With the above and other objects in view, the present invention includes a method of separating cations from an aqueous solution containing the same, comprising the step of contacting an aqueous solution containing in solution a cation adapted to form a sulfide which is at most slightly soluble in water with a shaped body of a material adapted to swell in contact with water and having distributed therethrough a sulfide of greater solubility in water than the sulfide of the cation, whereby the shaped body will swell and the sulfide of the cation will be precipitated in the shaped body thus separating the cation from the aqueous solution and incorporating the sulfide of the cation in the shaped body.

The present invention also contemplates a method of producing a shaped body of regenerated cellulose, comprising the steps of mixing into viscose a compound soluble in the viscose and including an element selected from the group consisting of arsenic and antimony, extruding the viscose having the compound dissolved therein so as to form without alkaline after-treatment a shaped body of regenerated cellulose containing the sulfide of the element formed by reaction of the compound with the viscose, and treating the thus formed shaped body with a solution of a water soluble salt of a metal having a greater affinity to sulfur than the element and the sulfide of which is at most slightly soluble in water, so as to replace in the shaped body of regenerated cellulose the element with the metal, thereby forming a shaped body of regenerated cellulose having incorporated therein the sulfide of the metal.

According to a preferred embodiment of the present invention, the same comprises a method of producing a metal sulfide-containing shaped body of regenerated cellulose, which method includes the steps of mixing into viscose having a pigment distributed therethrough a compound soluble in the viscose and including an element selected from the group consisting of arsenic and antimony, extruding the viscose having the compound dissolved therein so as to form without alkaline after-treatment a shaped body of regenerated cellulose containing the sulfide of the element formed by reaction of the compound with the viscose, treating the thus formed shaped body at a temperature of between about 80 and 100° C. with an aqueous treating solution of a water soluble salt of a first metal having a greater affinity to sulfur than the element, and the sulfide of which is at most slightly soluble in water, the metal being selected from the group consisting of copper, lead, mercury, silver, platinum, gold, tin, bismuth, iron, cobalt, nickel, zinc and cadmium, and the treatment with a solution of a salt of copper, lead, mercury, silver, platinum, gold, tin and bismuth being carried out at a pH of between 0 and 4 and with a solution of iron, cobalt, nickel, zinc and cadmium at a pH of between 4 and 8, so as to replace in the shaped body of regenerated cellulose the element with the metal, and treating the shaped body of regenerated cellulose containing the sulfide of the first metal with a water soluble salt of a second metal having a greater affinity to sulfur than the first metal and the sulfide of which is at most slightly soluble in water, so as to replace in the body the first metal with the second metal, thereby forming a shaped body of regenerated cellulose having the sulfide of the second metal incorporated therein.

Thus, it is possible according to the present invention, to remove metal ions which form sulfides which are at best difficulty soluble in water, from a solution thereof by contacting such solution with shaped bodies of a substance which is adapted to swell in water, so that the aqueous solution containing the metal ion can penetrate such bodies, and which bodies have incorporated and substantially evenly distributed throughout a sulfide of a cation which will be replaced by the metal ion so that the sulfide of the metal ion will then be distributed through the bodies of said substance.

In this manner, the metal ion will be removed from its aqueous solution. However, the present invention will also serve to incorporate in the swellable body, which might be a body of regenerated cellulose, a metal sulfide of desired color and thus to color, for instance, fibers of regenerated cellulose throughout their entire cross section, and not only at their surface, in a desired manner.

Referring to the last mentioned feature of the present invention, it has been found that arsenic compounds, however also antimony compounds, may be introduced into the viscose without impairing the state of dissolution of the cellulose xanthate and the spinnability of the viscose. The addition of an arsenic or antimony compound calculated as arsenic or antimony trioxide preferably is made in a quantity up to about 15% of the weight of the alpha cellulose content of the viscose in order not to cause too great a reduction in the mechanical strength of the extruded product. The arsenic which is thus introduced into the viscose will be present therein in the form of a thioarsenite or thioarsenate anion, i.e. in the form of a true solution, and antimony compounds which are introduced into the viscose will be transformed into corresponding anions.

When such viscose which, in accordance with the present invention, has distributed therethrough an arsenic or antimony-containing anion, is spun or extruded into a conventional coagulating bath which contains sulfuric acid and sodium sulfate and which may also contain zinc sulfate, then, during regeneration of the cellulose hydrate, the dissolved arsenic will precipitate in the extruded fiber or the like, particularly in the outer portions of the extruded body, in the form of arsenic trisulfide and/or arsenic pentasulfide or, if an antimony compound has been introduced into the viscose, the corresponding antimony sulfides will precipitate in finely subdivided form in the fiber, sheet or the like of regenerated cellulose. By subjecting the freshly spun or extruded fiber, sheet, foil, or the like to acidic decomposition, however omitting the conventional alkaline treating baths, a shaped body of regenerated cellulose will be obtained which, depending on the proportion of arsenic orginally introduced into the viscose, the titer of the fiber or the cross-sectional thickness of the sheet, and the bath composition, will contain between about 50 and 75% of the originally introduced arsenic in the form of arsenic sulfides.

According to the present invention, the fiber, foil or the like which thus will have arsenic sulfide finely distributed therethrough, is then treated with an aqueous solution of at least one metal salt, the sulfide of which is at best difficulty or only slightly soluble in water. Thereby, the respective metal sulfide will be precipitated in the fibers or foil under simultaneous dissolution of the arsenic. In this manner, the arsenic of the arsenic sulfide in the fiber, foil or the like may be replaced for instance with gold, platinum, mercury, silver, copper, lead, tin, cadmium, bismuth, antimony, cobalt, nickel, iron or zinc. Due to the relatively large sulfer content of the arsenic sulfide, it is possible in this manner to precipitate a relatively large quantity of metal sulfides by replacement of a relatively small quantity of arsenic.

Due to the fact that the above described reaction is a heterogeneous reaction, the effect of temperature variations on the speed of the reaction between the solid phase of the arsenic sulfide and the dissolved cations of the liquid phase is greater than is the case in purely ionic reactions which generally will proceed in a quantitative manner and substantially instantaneously. Thus, the reaction of the sulfide-containing fiber within cations, with a pH range of between 0 and 7, may be compared with respect to procedure, speed of reaction and dependence on temperature to the substantive dyeing of regenerated cellulose. Consequently, in order to increase the reaction speed, the replacement of arsenic with a metal forming a relatively insoluble sulfide is preferably carried out at an elevated temperature, and most preferably between about 80 and 100° C., i.e., just slightly below the boiling point of the solution. Preferably, the treatment of the regenerated cellulose fibers, foils or the like is carried out with an excess amount of the respective cations, i.e., the amount of metal ions in the treating solution should be greater than the amount required for the replacement of all of the arsenic contained in the regenerated cellulose in the form of arsenic sulfide. A ratio of goods, i.e. regenerated cellulose, to treating liquor of about 1 to 50 has been found to give good results. Under such conditions, the reaction is completed in an hour or less and, generally, between 80 and 85% of the theoretically available arsenic sulfide is transformed thereby into the sulfide of the respective cations. The cations which are to replace the arsenic of the arsenic sulfide in the regenerated cellulose body may be introduced into the treating solution in the form of salts whereby, generally, the cation may be bound to any acid radical. Thus, the metals may be introduced in the form of their chlorides, sulfates, nitrates, etc. However, it must be considered that during the reaction of the arsenic sulfide-containing fibers with metal salts of strong acids, free acid will be formed by hydrolytic decomposition of the newly formed arsenic compound. Consequently, if the newly formed metal sulfide is easily soluble in acids, such as would be the case with cobalt, nickel, iron or zinc sulfides, it is advisable to introduce the metallic cation in the form of its acetate or as salt of a comparable weak acid or to add buffer salts formed of strong bases and weak acids in order to render the free acid harmless. To buffer the solution or to use metal salts of weak acids frequently is also desirable in order to prevent injury to the regenerated cellulose body which may be caused by free mineral acid formed during the exchange of arsenic against the metallic cation.

Although the sulfides of most of the metals mentioned above are of black color, it is nevertheless possible to react some of the metal ions at relatively low pH so as to obtain different and unusual colorations of the fibers or other bodies of regenerated cellulose which are treated in accordance with the present invention. Thus, for instance, copper and lead salts when applied within a pH range of between 0 and 4 will precipitate as reddish brown or rust red compounds in the regenerated cellulose fiber or the like. At a pH of about 4.5, nickel salts will react with arsenic sulfide-containing fiber or the like under formation of an olive green tint. All of these colorations are characterized by their great brilliancy and excellent color fastness. The color tint will become darker with an increase in the pH of the reaction solution. Correspondingly, the amount of precipitated metal sulfide also will increase.

It is also possible to carry out the above process simultaneously with conventional spin dyeing by admixing to the viscose in addition to the arsenic or antimony compound also a pigment dye which is not affected by sulfur. For instance, forming according to the present invention in the body of regenerated cellulose a yellow cadmium sulfide in the presence of a blue pigment dye will result in a corresponding green coloration of the regenerated cellulose fibers or the like and the thus formed green color will also possess excellent color fastness.

Generally, the reaction of the arsenic sulfide-containing fiber with the dissolved metal salts will not be carried out in a quantitative manner. For this reason, it is usually advisable to arrange an after-treatment after the above reaction has been completed, on the one hand in order to remove any arsenic which may have been retained in the fibers and on the other hand, in certain cases, also in order to stabilize the compounds formed by the above-described reaction. Particularly, when the above-mentioned color tones are to be obtained by reaction in a slightly or a more strongly acidic solution, an after-treatment is required in order to make the thus-obtained color tones resistant against alkali. Such after-treatment preferably is carried out with zinc or cadmium ions which will react quite quickly with the remaining and previously unreacted arsenic sulfide retained in the regenerated cellulose fibers or the like. Such after-treatment with zinc ions will not affect the previously obtained color tone since zinc sulfide is colorless, and by using cadmium salts, the color change will be relatively insignificant due to the weak yellow color of cadmium sulfide.

In order to remove residual arsenic compounds, it is generally preferred to carry out an after-treatment of the regenerated cellulose fibers or the like with alkaline solutions. Particularly good results have been obtained by carrying out such after-treatment with hot diluted sodium hydroxide having a concentration of between about 2 and 4 grams of sodium hydroxide per liter of aqueous solution. Such alkaline washing of the pre-treated regenerated cellulose fibers or the like may also be carried out subsequent to a zinc or cadmium salt treatment which in turn is carried out after colored metal sulfides were formed initially in the regenerated cellulose. Such washing of the regenerated cellulose fibers or the like in an aqueous alkaline solution will not influence the color of the fibers or the like which previously were subjected to an intermediate treatment with zinc or cadmium salts, while without such intermediate treatment, the alkaline washing of the metal sulfide-containing fibers or the like will convert the color thereof into black.

The affinity of metals to sulfur and thus the tendency to form metal sulfides will decrease in the following sequence:

Mercury, silver, copper, lead, tin, cadmium, antimony (cobalt, iron, nickel), zinc, arsenic. Cobalt, iron and nickel have equal affinity to sulfur and thus are interchangeable.

Thus it will be observed that of the above mentioned metals only the salts of mercury, silver, copper, lead, tin, cadmium may be used according to the present invention when initially an antimony compound has been introduced into the viscose so that the regenerated cellulose prior to treatment with the metal salt solution contains an antimony sulfide.

In this series, the first listed cations are capable of replacing the subsequently listed cations from their sulfides. This series differs from the electrochemical series and it differs also from the series of the solubility products of the respective sulfides. It seems that the above listed series of metals is a specific series representing the sequence in which the affinity of the metals to sulfur becomes weaker in the direction from mercury to arsenic.

Due to the difference in the affinity of the individual cations to sulfur, it is also possible to further react the product which has been obtained by reacting the arsenic sulfide-containing fibers or the like with a metal salt. The thus obtained product may then be reacted with a solution of cations which possess a greater affinity to sulfur than that of the originally reacted metal. This is of particular importance with respect to the zinc sulfide-containing regenerated cellulose products of the present invention which thus lend themselves to additional reactions which will be discussed in detail further below.

It is an important problem in the production of metal sulfide-containing yarns, fibers or foils in a continuous manner, for instance, synchronized with the spinning process, as an after treatment thereto, to reduce the required reaction time from about 45 to 60 minutes to a much shorter period such as a period between about one and a half and two minutes. Such increase in the speed of the reaction between arsenic sulfide and the respective cation is achieved according to a further feature of the present invention by suitably converting the arsenic sulfide into sulfide ions which are capable of reaction substantially instantaneously with the metallic cations. For this purpose, the arsenic sulfide is to be dissolved at an alkaline pH range whereby sulfide ions are formed by secondary dissociation of the thioarsenite anion.

However, the dissolution of the arsenic sulfide must not be carried out at such speed that the reaction zone in which the thus formed sulfide ions and the dissolved cations are to react with each other will be depleted of available cations, particularly since, as will be discussed below, the cations too are formed only by secondary dissociation of their complex compounds in the alkaline medium. It is necessary to adjust the speed of dissolution of the arsenic sulfide to the speed of diffusion of the metal ions. If the speed of dissolution is too great, as would be the case by treating the arsenic sulfide-containing fibers with strong lyes, then the reaction zone wherein sulfide and metal ions will react will be dislocated and will be located outside of the cross section of the fiber or the like and thereby the color fastness of the precipitated metal sulfide will be reduced. In the presence of a relatively large proportion of ammonia it is possible to react complex metal amines at room temperature with arsenic trisulfide-containing fibers and to obtain a satisfactory color fastness of the precipitated sulfides, however, in view of the low temperature, it is not possible in this manner to reduce the reaction time below the above described period of about between 45 and 60 minutes.

By using primary, monovalent or polyvalent organic amines, such as diethylene triamine or ethylene diamine which are capable to form soluble complex compounds with metals such as silver, copper and zinc, it is possible to achieve at a temperature of about 85° C. and in a pH range of between about 8 and 10 a favorable catalytic acceleration of the reaction between arsenic sulfide and the above mentioned metals, without causing bleeding of the thus-formed sulfides from the regenerated cellulose fibers or the like. To proceed in this manner, which herein will be named a catalytic acceleration of the reaction, gives particularly good results by reacting arsenic sulfide-containing fibers and the like with zinc compounds. For instance, in the presence of ethylene diamine, the reaction between arsenic sulfide-containing regenerated cellulose and zinc compounds at a temperature of 85° C. will be completed in about one and a half minutes to the extent of between 85 and 90% of the theoretically possible replacement of arsenic.

When reacting the arsenic sulfide contained in the regenerated cellulose fiber or foil at first with zinc sulfide, the required reaction time between the stationary sulfide and the dissolved metal ions can be further reduced by carrying out such reaction in the presence of a mineral acid. Due to the solubility of zinc sulfide in such acid, sulfide ions are formed which under suitable reaction conditions will react with the metal ions prior to reacting with hydrogen ions under formation of hydrogen sulfide. Particularly good results are obtained by using perchloric acid in a concentration of between about 0.2 to 0.5%, since all metal perchlorates which might be formed are water soluble and since during the relatively short reaction time of between 1 and 2 minutes, neither oxidative nor hydrolytic decomposition of cellulose will take place.

The last described method, i.e. acidic catalytic acceleration of the reaction between the stationary sulfide and the dissolved metal ions has the advantage that thereby a quick reaction can be achieved with all metals which do not form soluble complex compounds with amines. Mercury, lead and bismuth, as well as the metals of the tin group, antimony and tin, the sulfides of which are soluble in alakaline solutions, belong into this group.

It is of course also possible to react zinc sulfide-containing regenerated cellulose fibers and the like with metal ions in an alkaline medium, however, due to the resistance of the zinc sulfide against alkali, in such case no catalytic acceleration of the reaction will take place. In this connection, it is particularly interesting to consider reactions in an alkaline medium which at the temperature of 90° C. may be terminated in 60 minutes. Thereby up to three times as much metal can be precipitated in the fiber than would normally be precipitated if the reaction were carried out within the pH range of between 0 and 7. The foregoing refers particularly to lead, copper and bismuth which may be applied as sodium plumbite or as the alkaline tartaric acid complex compounds of copper (Fehling's solution) and bismuth (Nylander's solution). In this case, probably, the non-sulfidic metal will be present in the fibers or the like as a metal hydroxide. In certain cases, the use of complex amine compounds will also increase the amount of the metal compound which is precipitated in the filter, for instance in the case of silver, whereby nearly 200% of the amount of silver based on the sulfur content of the arsenic trisulfide-containing fiber or the like can be precipitated.

The use of the sulfide-containing fiber or the like as an intermediary in the production of metal sulfide-containing fibers offers the further advantage that the relatively small proportion of arsenic sulfide initially incorporated in the regenerated cellulose body which is still present after the reaction with zinc ions, will be substantially completely eliminated by again reacting the zinc sulfide-containing fiber with another metal ion.

Metal sulfide-containing fibers produced according to the present invention are suitable for further textile processing provided that the pigment content thereof, i.e. the content of metal sulfide of such regenerated cellulose fibers does not exceed between about 20 and 25% of the weight of the regenerated cellulose. Although the textile qualities of the fibers are somewhat diminished with increasing sulfide content, nevertheless, up to the above mentioned limit, the fibers are still suitable for textile purposes. Due to the fact that the incorporated or embedded metal sulfides do not form a coherent layer, the sorptive qualities of the regenerated cellulose fibers are not substantially affected. Due to the precipitation of the metal sulfide in the interior of the fiber, the wash and solvent fastness of the thus produced fibers is comparable to that of fibers formed of a dyed viscose or the like, i.e. fibers which are dyed prior to extrusion of the same. As a result thereof, it is one of the advantages of the present invention that, in accordance therewith, regenerated cellulose fabrics may be produced which possess brilliant coloring combined with a high degree of wash and solvent fastness.

Furthermore, the yarns, fibers or foils which are produced according to the present invention and which contain a relatively large proportion of metal sulfides, can be advantageously used as protective elements against high energy radiation. Particularly fibers which contain lead sulfide are highly suitable for absorbing short wave radiation such as X-rays. Cadmium sulfide incorporated into the fiber will have a protective effect against neutron radiation.

The amount of arsenic trioxide or other arsenic or antimony compounds which is initially incorporated in the fiber should not exceed about 15% of the weight of the alpha cellulose since fibers having a higher arsenic or the like content will not possess the desired strength during the spinning process. Preferably, the amount of arsenic trioxide or antimony trioxide or the like should be between 4 and 8% of the weight of the alpha cellulose, although even smaller proportions may be used, the lower limit being set by practical considerations such as the correspondingly reduced amount of metal sulfide which eventually will be formed in the regenerated cellulose body. Arsenic or antimony trioxide of pentoxide as well as the corresponding chlorides, i.e. trichloride and pentachloride are preferably used for incorporating arsenic or antimony into the viscose. Other compounds such as the corresponding bromine and iodine compounds may also be used but are of less practical importance due to their high cost.

The following examples are given as illustrative only of the present invention, without, however, limiting the invention to the specific details of the example.

EXAMPLE I

For the treatment of a viscose (the term "viscose" is used in the specification and claims to denote the viscose solution prior to extrusion or spinning of the same) which contained 9% alpha cellulose and 7.5% sodium hydroxide, and which had been prepared with 35% carbon disulfide, 8% of arsenic trioxide based on the amount of alpha cellulose and dissolved in aqueous sodium hydroxide (130 g./l. $As_2O_3$; 160 g./l. NaOH) were admixed to the viscose as originally prepared. After reaching a Hottenroth ripeness of 12.2, the viscose was spun through a spinneret having 1,200 bores of 120 microns diameter into an aqueous coagulation bath maintained at 50° C. and containing per liter 95 grams sulfuric acid, 20 grams zinc sulfate and the amount of sodium sulfate required to raise the density of the bath to 1.265. The filaments were passed through the bath for a distance of 50 centimeters. A yarn including 1200 individual filaments was formed, withdrawn in conventional manner and passed under stretching through an aqueous acid bath so that the filaments were stretched by 63%. The aqueous acid bath contained 55 grams sulfuric acid per liter and was maintained at a temperature of 80° C. The final withdrawal speed of the yarn equalled 50 meters per minute. The yarn was cut into staples in conventional manner and thereafter immersed in a water bath maintained at 98° C. and containing 1 gram sulfuric acid per liter.

The conventional steps of the viscose process which were briefly mentioned above, are of course well known to those skilled in the art and more fully described in a considerable number of publications, for instance, in "Chemiefasern," 2nd edition, 1951, by K. Goetze, and in "Artificial Fibers" by R. W. Moncrieff, John Wiley & Sons, Inc., New York, 1950.

The desulfurization of the thus obtained regenerated cellulose with diluted sodium hydroxide solution which conventionally follows the immersion of the staples in the last mentioned water bath, however, was omitted.

The staple fiber spun as described above contained, based on cellulose, 2.9% sulfur, 3.6% arsenic and had a titer of 7 denier.

20 grams of the thus obtained arsenic sulfide-containing fibrous material were then reacted for one hour at 90° C. in one liter of water containing 7.6 grams of $$Pb(CH_3COO)_2 \cdot 3H_2O$$

The solution contained a small amount of acetic acid in order to maintain the pH of the solution at 4.3. After one hour the reaction was completed and the now greyish-black fibrous material was thoroughly washed with water, treated for two minutes at a temperature of 90° C. with dilute aqueous sodium hydroxide containing 4 grams NaOH per liter, again washed and then softened, for instance as described on pages 572–612 of the above-mentioned text by Goetze. The thus treated material contained 15.6% of lead sulfide, corresponding to 71.6% of the theoretical yield based on the sulfur content of the arsenic sulfide-containing fiber.

Textile analysis of the thus obtained lead sulfide-containing staple fiber gave the following results:

Denier (eff.) ------------------------------- 7.16
Tenacity (dry) ----------------------Rkm-- 20.2
Tenacity (wet) ----------------------Rkm-- 11.1
Elongation (dry) ---------------------pct-- 19.4
Elongation (wet) ---------------------pct-- 24.4
"Schlingenfestigkeit" (Loop strength) -----Rkm-- 5.8

"Rkm" is a measure of the length at which the freely hanging fiber would tear under its own weight. It may also be expressed in grams per denier, whereby one gram per denier equals 1/9 of one Rkm. The "Loop strength" was determined in accordance with the method described in "Chemiefaser," 2nd edition, 1951, by K. Goetze, and in "Physics and Chemistry of Cellulose Fibers," 1949, by P. H. Hermans.

EXAMPLE II

Viscose was spun as described in Example I, however after the incorporation of a larger quantity of arsenic trioxide, namely 15% arsenic trioxide based on the alpha cellulose content of the viscose. A thread of 7 denier containing 5.15% sulfur and 5.9% arsenic was formed.

20 grams of the thus produced arsenic sulfide-containing fibers were treated in one liter of water which had been slightly acidified with acetic acid to a pH of 5 and which contained 12 grams $Pb(CH_3COO)_2 \cdot 3H_2O$. The treatment was carried out at a temperature of 90° C. for a period of one hour. The fibers were then washed, softened and dried. It was found that the lead sulfide content of the thus produced charcoal grey fibers equalled 25.5%, 66.5% of the theoretical yield based on the sulfur content of the arsenic sulfide-containing fiber.

EXAMPLE III

A staple fiber yarn having a titer of 7 denier was spun as outlined in Example I, however, with the addition to the viscose of 4% arsenic trioxide, based on the alpha cellulose content of the viscose. The regenerated cellulose fibers contained 1.68% sulfur and 2.41% arsenic.

20 grams of the thus obtained arsenic sulfide-containing fiber were reacted for one hour at 90° C. in one liter of water containing 3 grams $Cd(CH_3COO)_2 \cdot 2H_2O$. The fiber was first treated as described in Example I and was thereafter found to contain 6.38% cadmium sulfide, corresponding to 84.5% of the theoretical yield based on the sulfur content of the arsenic sulfide-containing fiber.

EXAMPLE IV 20 grams of arsenic sulfide-containing regenerated cellulose fiber having a sulfur content of 1.64% and an arsenic content of 2.0% were reacted for one hour at 90° C. in one liter of a 0.5% aqueous solution of perchloric acid containing 4 grams of $Pb(CH_3COO)_2 \cdot 3H_2O$. The coloration of the thus treated fiber was stabilized against attack by alkaline treatment by reacting the fiber for one hour at 90° C. in one liter water containing 3 grams $Cd(CH_3COO)_2 \cdot 3H_2O$, and thereafter washing the fiber and subjecting the same to a softening treatment. The thus obtained fibrous material was of rust red color and contained 5.32% lead sulfide corresponding to 32.5% of the theoretical yield based on the sulfur content of the arsenic sulfide-containing fiber.

By replacing the lead acetate with 2.5 grams

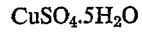
$CuSO_4 \cdot 5H_2O$ while otherwise proceeding as outlined herein, a copper colored fiber containing copper sulfide, equal to 41% of the theoretical yield, was obtained.

EXAMPLE V

A solution of 4% (based on alpha cellulose) of arsenic trioxide dissolved in aqueous sodium hydroxide was introduced into the viscose and spun as described in Example I. After acidic decomposition of the staple fiber, the fiber fleece was passed through a water washing device and thereafter rinsed with between 50 and 80 times its own weight of an aqueous solution containing per liter 5 grams of zinc sulfate and 7 cubic centimeters of ethylene diamine. The solution was maintained at 85° C. and had a pH of between 10 and 11. The speed of passage of the staple fleece was adjusted in such a manner that individual portions thereof were exposed to the zinc sulfate-containing solution for a period of 90 seconds. Thereafter, the staple fibers were treated at 85° C. with diluted aqueous sodium hydroxide solution containing between 2 and 4 grams per liter of sodium hydroxide, then washed with water, softened and dried in conventional manner.

The thus treated fiber had the color of unbleached staple rayon and contained 4.1% zinc sulfide based on alpha cellulose.

EXAMPLE VI 20 grams of staple fiber containing 4.1% zinc sulfide and obtained as described in Example V, were treated for five minutes in one liter of an aqueous solution containing 5 cubic centimeters of concentrated sulfuric acid and 2.5 grams of $CuSO_4 \cdot 5H_2O$. The treating solution was maintained at 90° C. Thereafter, the staple fiber was washed and softened. In this manner a fiber of dark olive color containing 3.91% of copper sulfide corresponding to 97% of the theoretical yield based on the zinc sulfide content of the fiber, was obtained.

EXAMPLE VII 20 grams of the fiber produced according to Example V were reacted for one hour at 90° C. in a solution made up of 15.2 grams $Pb(CH_3COO)_2 \cdot 3H_2O$. 100 cubic centimeters of 17.5% aqueous sodium hydroxide solution and 900 cubic centimeters of water. After washing, softening and drying in conventional manner, a fiber of deep black color was obtained, containing 27.06% lead.

By replacing the lead acetate with 10 grams

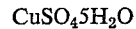
$CuSO_4 5H_2O$ and adding a sufficient amount of tartaric acid so that the copper hydroxide which is formed upon addition of the 100 cubic centimeters of 17.5% sodium hydroxide will form a complex solution, and after a reaction period of one hour at 90° C. fibers were obtained which contained 8% of copper.

EXAMPLE VIII 10 grams of arsenic trisulfide-containing fiber having a sulfur content of 1.52% were reacted for one hour at 25° C. in a solution formed of 2.9 grams

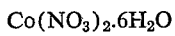
$Co(NO_3)_2 \cdot 6H_2O$ in 100 cubic centimeters of an aqueous ammonia solution (density 0.92) and 400 cubic centimeters of water. The thus treated fiber was washed and softened in conventional manner and it was found that the final product obtained in this manner contained 3.55% cobalt sulfide, corresponding to 82% of the theoretical yield.

EXAMPLE IX

A viscose was prepared with 13.2% $Na_3SbS_4 \cdot 9H_2O$ based on the alpha cellulose content of the viscose, and spun, substantially as described in Example I. Thereby, an antimony pentoxide-containing fiber of 1.40% sulfur content was obtained.

20 grams of the thus obtained fiber were treated for five minutes at 90° C. in 1000 grams of an aqueous solution containing 7 grams silver nitrate and 3 cubic centimeters ethylene diamine. The solution was adjusted to a pH of about 10. After-treatment was carried out substantially as described in Example I, and in this manner a black fiber containing 15.5% silver was obtained.

EXAMPLE X

Viscose, to which had been added 7.8% "Luxanthol blue FG" based on the alpha cellulose content of the viscose was treated and spun as described in Example I, but with an addition of arsenic trioxide so proportioned that a fiber was obtained containing 0.8% alpha-copper-phthalocyanine, commercially available, for instance, under the tradename "Luxanthol blue FG," and 1.24% sulfur in the form of arsenic sulfide.

20 grams of the thus obtained fiber were treated for one hour at 90° C. in one liter of an aqueous solution containing 2 grams $Cd(CH_3COO)_2 \cdot 2H_2O$ and the small amount of acetic acid required for maintaining a pH of about 5, substantially in the manner described in Example III.

The thus treated fiber was then subjected for five minutes at 90° C. to an after-treatment in dilute aqueous sodium hydroxide containing 4 grams of sodium hydroxide per liter. After conventional washing and softening, an intensively green colored fiber was obtained which contained 4.8% of cadmium sulfide in addition to 0.8% "Luxanthol blue FG."

EXAMPLE XI

A viscose containing 9% alpha cellulose, 6.5% sodium hydroxide and an amount of arsenic trioxide which equalled 4% of the alpha cellulose, and which had been prepared with 32% carbon disulfide, was spun at a Hottenroth ripeness of 5.1 through a slot-shaped nozzle into an aqueous coagulation bath maintained at 45 C. and containing per liter 150 grams sulfuric acid and the amount of sodium sulfate required to maintain the density of the bath at 1.216. The thus formed arsenic trisulfide-containing foil was passed at a temperature of 45° C. through two tubs filled with aqueous sulfuric acid solution containing about 120 grams of sulfuric acid per liter. The foil was then washed to remove acid therefrom and thereafter passed through two tubs filled with an aqueous solution of 5 grams per liter of $CuSO_4 \cdot 5H_2O$ and 7 cubic centimeters of ethylene diamine, and being maintained at 85° C. Contact between the bath and the copper sulfate-containing solution was maintained for at least two minutes. Thereafter, the foil which now had acquired a dark olive color was passed at 85° C. through a dilute aqueous sodium hydroxide solution containing between 2 and 4 grams of sodium hydroxide per liter. The thus treated foil was then freed of alkali by washing with water at 60° C. and was then passed in conventional manner through a softener bath and finally dried on heated rolls and wound up into coils. The final product contained 3.8% copper sulfide based on the cellulose content of the foil.

EXAMPLE XII

A solution of 4% (based on alpha cellulose) of arsenic trioxide dissolved in aqueous sodium hydroxide was introduced into the viscose and spun as described in Example I. After acidic decomposition of the staple fiber, the fiber fleece was passed through a water washing device and thereafter rinsed with between 50 and 80 times its own weight of an aqueous solution containing per liter 5 grams of zinc sulfate and 7 cubic centimeters of diethylene triamine. The solution was maintained at 85° C. and had a pH of between 10 and 11. The speed of passage of the staple fleece was adjusted in such a manner that individual portions thereof were exposed to the zinc sulfate-containing solution for a period of 90 seconds. Thereafter, the staple fibers were treated at 85° C. with diluted aqueous sodium hydroxide solution containing between 2 and 4 grams per liter of sodium hydroxide, then washed with water, softened and dried in conventional manner.

The thus treated fiber had the color of unbleached staple rayon and contained 4.1% zinc sulfide based on alpha cellulose.

In addition to diethylene triamine and ethylene diamine, it is also possible to use, in accordance with the present invention, other water-soluble primary, secondary or tertiary mono- and polyvalent organic amines which are capable of forming water-soluble complex compounds with metals and having in aqueous solution at a temperature of 90° C. a low vapor tension, such as monoethanolamine, propylene diamine, cyclohoxylamine.

As pointed out further above, the present invention is also concerned with incorporating sulfides adapted to react with certain cations, finely distributed in a material which will swell but will not be dissolved in water, and to use the sulfide-containing material for precipitating therein metal ions which will form sulfides which are at best difficultly soluble in water.

In this manner the grain size of the individual metal sulfide particles and thus the speed of the reaction between the same and the dissolved cations will remain constant even if shape and size of the particles of hydrophilic, swellable, sulfide-containing material is changed, i.e., adjusted to the required speed of flow of the solution from which the cation, i.e., the metal ion which will form a difficultly soluble sulfide, is to be removed.

The speed of reaction between the metal sulfide initially incorporated in the bodies of swellable material and the cations which are capable of forming more difficultly soluble sulfides will remain practically unaffected by the hydrophilic medium.

Regenerated cellulose as well as cellulose derivatives such as cellulose ethers and cellulose esters were found to be particularly well suited to form bodies which will be capable of swelling in water and will be permeable for the ions of the aqueous solution, as well as adapted by having incorporated therein the sulfides which are capable of reacting with the dissolved cations.

Metal sulfide-containing cellulose or derivatives thereof may be produced by a spinning or extrusion method such as described further above, so that the swellable material which contains the metal sulfide will be in the shape of fibers or foils. However, it is equally possible to use sulfide-containing bodies of different shape such as spherical bodies or lens-shaped bodies of cellulose derivatives, regenerated cellulose or other materials which are capable to swell in water without being dissolved therein.

Such materials which are capable of swelling in water without being dissolved include starch, gelatin, glycogen, proteins, pectin and many polymerization products such as certain rubber products, polystyrene, polyacrylic ester, polyvinyl chloride and other polyvinyl compounds. All of these materials can be shaped in known manner into fibers or films, whereby it is also possible during the shaping to distribute metal sulfides therethrough in accordance with the present invention.

The shaping, in the case of cellulose ethers, starch, gelatin, glycogen, pectin and protein is essentially carried out in such a manner that the material is dissolved in dilute alkali hydroxide, for instance in 7% aqueous sodium hydroxide, and is then spun or extruded into a bath of weak acid or acid and salts, wherein the material coagulates. Cellulose acetate is generally spun from a solution thereof in acetone, and usually in dry condition, i.e. the acetone is permitted to evaporate. Materials such as rubber, polyacrylic ester, polyvinyl chloride and the like are usually dissolved in organic solvents such as benzene, carbon tetrachloride or the like and shaped into fibers, either by allowing the solvent to evaporate from the extruded or spun material, or by washing the extruded material with solvent of low boiling point, such as acetone, alcohol or the like.

The shaping of materials which are capable of swell in water is well known per se and is described in more detail in the literature, for instance in the German text by Pummerer, entitled "Chemische Textilfasern, Filme and Folien" published in Stuttgart in 1953.

In the case of cellulose xanthogenate solution as the starting material for producing sulfide-containing shaped bodies, the sulfide ions are already present in the solution. When then to such viscose metal salts are added which will form only in an acidic medium with the already present sulfide ions difficulty soluble sulfides, such as compounds of arsenic, antimony and tin then, upon extrusion of the xanthogenate solution which includes these compounds, into a coagulating or precipitating bath containing sulfuric acid, it will be accomplished that the sulfides will be precipitated within the coagulating cellulose in very fine distribution. The hydrated regenerated cellulose will prevent an enlargement of the individual sulfide particles and thus the high reactivity of the precipitated sulfides, which is primarily due to the relatively large surface area of the relatively very small individual particles, will be maintained even after further reaction. The amount of metal salts such as arsenic, antimony or tin compounds which may be thus mixed into the viscose may vary within very wide limits, for instance between 1 and 30%. However, preferably between 3 and 25% or most preferably between 5 and 12% of such metal salt will be contained in the viscose fibers or the like.

Shaped bodies of cellulose derivatives may be formed by introducing into an alkaline solution thereof stoichiometric quantities of an alkali metal sulfide and of an arsenic compound, and then coagulating the cellulose derivative with acid.

Lens-shaped bodies are obtained by introducing droplets of an about 5% solution of thioarsenide-containing regenerated cellulose or cellulose derivatives into a coagulating bath. By emulsifying such solution in a medium which is not miscible with water and coagulating the thus formed droplets with an acid which is soluble in the phase which is not miscible with water, for instance with acetic acid, it is possible to obtain spherical bodies of about 1 mm. diameter.

The speed of reaction of the metal sulfides which are precipitated together with the cellulose or cellulose derivatives or the like, of which arsenic sulfide appears to be one of the most important, can be considerably improved by reacting the initially precipitated arsenic sulfide with other cations, the sulfides of which possess a higher reaction speed at room temperature than the arsenic sulfide. Such other cations which are used to replace the arsenic of the sulfide preferably will be such which in addition to being able to replace the arsenic, can be easily replaced by cations of the type which are to be removed from a solution containing the same. Cations which are suitable for this purpose, i.e., for replacing the arsenic or the like generally include nickel, cobalt, iron, zinc, thallium, cadmium, and also others, depending on the type of cation which subsequently is to be removed from a solution.

In order that a reaction will take place between the metal sulfide incorporated in the body capable of swelling in water and the cation dissolved in an aqueous solution, it is necessary that the compound which will be formed by such reaction, i.e., the sulfide of the dissolved cation will be less soluble in water than the metal sulfide which was distributed through the body of swellable material. For instance, a dissolved cation will react with zinc sulfide only if the solubility product of the sulfide of the cation is smaller than the solubility product of zinc sulfide. However, due to the complex nature of some of such reactions, the sequence of the solubility of the metal sulfides does not without exception indicate the sequence in which the same are capable of reacting.

Metals may be arranged in the following sequence or replacement series in which they are capable of replacing each other from their sulfides:

Gold, osmium, ruthenium, palladium, mercury, silver, bismuth, copper, lead, cadmium, thallium, zinc (iron, cobalt, nickel); iron cobalt and nickel being interchangeable.

The first mentioned metals of the series are capable of replacing the later mentioned metals from the sulfides thereof. Thus, for instance, when iron sulfide is incorporated in a material capable of swelling in water, then such iron sulfide will react with dissolved ions of all of the metals listed above with the exception of cobalt and nickel.

The ability of the swellable material to bind metal ions is controlled by the content of reactive metal sulfide therein, which may be adjusted, for instance, by controlling the amount or proportion of the metal which is introduced during or before the forming of the shaped body. A proportion of 1.6% of sulfidic sulfur in the material capable of swelling with water corresponds, in a stoichiometrically proceeding reaction to a capacity of 1 mval per gram. It will be understood that "val" is meant to denote the equivalent weight, i.e., the molecular weight divided by the valence. Thus, "mval" denotes $\frac{1}{1000}$ of the equivalent weight. By indicating the capacity as "1 mval per gram," it is thus indicated that per gram of the material $\frac{1}{1000}$ of the equivalent weight of the reacting compound can be reacted. For instance, when the material contains 1.6% of sulfidic sulfur, in view of the molecular weight of sulfur which is equal to 32 and the valence of the sulfidic sulfur which is 2, the material which contains 1.6% sulfidic sulfur and has a capacity of 1 mval per gram, will be capable of reacting with $\frac{1}{1000}$ of the equivalent weight of any substance including a cation which under the prevailing conditions can be bound as sulfide.

Generally, when fibrous or foil-shaped bodies of regenerated cellulose or cellulose derivatives are to be used according to the present invention, an addition of between 8 and 12% of arsenic trioxide relative to the weight of alpha cellulose in, for instance, the viscose will give the desired result. The thus obtained material contains between 2.8 and 3.6% of sulfur and has an average capacity of about 2 mval. per gram.

However, by using different methods of producing the shaped bodies, it is possible to obtain shaped bodies which contain considerably larger proportions of metal sulfide. Thus, spherical bodies may be produced which contain the sulfide formed of about 20% arsenic trioxide in the material and this will correspond to a theoretical capacity of 4.85 mval. per gram.

The metal ions-binding material is exhausted when the reacting metal sulfide thereof is completely reacted. Sometimes these reactions actually take place in nearly stoichiometrical proportions. However, due to the possibility that mixed salts will be formed or due to the reducing effect of the sulfide ion which might lead to precipitation of the metal per se, the capacity of the metal ion-binding material according to the invention may in fact be greater than that which would be calculated from the sulfur or metal content thereof. Such mixed salts which may be formed are mainly basic salts such as a mixture of lead sulfide and lead hydroxide, whereby the lead hydroxide is adsorbed on the lead sulfide. It is also possible that mixtures of lead sulfide and metallic lead will precipitate whereby then again the metallic lead is adsorbed on the lead sulfide.

The breakthrough capacity of the sulfide-containing material which is adapted to swell in water grows with increasing distance of the relative position of the metal of the sulfide in the swellable material from the metal of the solution which is to be removed from the solution, in the replacement series of metals described further above. Thus, the maximum breakthrough capacity, i.e., the maximum capacity prior to breakthrough of the solution, or in other words, maximum capacity of taking up dissolved metal up to the point when the dissolved metal-containing solution passes through the sulfide-containing column of swellable material without being reacted at all, theoretically will be found in the combination of a swellable material containing a nickel sulfide and gold cations which are to be removed from a solution thereof. The chemical stability of the sulfide-containing swellable material depends on the type of the metal sulfide distributed therethrough. For instance, zinc sulfide and ferrous sulfide can be used only within a pH range of between 4 and 14 since at a lower pH, i.e., greater acidity of the solution, these sulfides will become soluble. Arsenic sulfide is soluble in alkaline solutions and therefore can be used only within a pH range of between 0 and 7.5. Furthermore, the usefulness of the sulfide-containing material in strongly acidic solutions is limited by the chemical attack of such strongly acidic solutions on the swellable material. The metal sulfides, furthermore, vary in their sensitivity against oxidation. While, for instance, silver sulfide and copper sulfide are highly resistant against oxidizing agents, iron sulfide in moist condition will be oxidized by the oxygen of the air.

The temperature resistance of the material depends on the qualities of the swellable material or carrier substance. For instance, in the case of regenerated cellulose and cellulose derivatives, the sulfide-containing material will be useful up to a temperature of about 120° C. Starch, gelatin, cellulose ethers, pectin, protein also will be suitable for use only up to a temperature which does not substantially exceed 120° C. However, polymerizates, such as polystyrene, or rubber or polyacrylic ester, polyvinyl chloride and the like may be used at temperatures up to 160° C. or possibely even somewhat higher. Obviously the usefulness of the sulfur-containing material at higher temperatures depends on the melting point of such swellable materials or on the temperature at which the material is changed in its physical or in its chemical characteristics.

The selectivity of the ion-binding sulfide with respect to heavy metal ions can be increased by choosing a metal sulfide which, in the above described replacement series, is sufficiently distant from the metal, the ion of which is to be bound. By interconnecting several ion binding materials, which include sulfides of metals taken from different portions of the replacement series, it will become possible to bind and hold different metal ions at different portions of the column.

Regeneration of the ion-binding material according to the present invention depends on two conditions:

(1) The cation of the reaction metal sulfide must be capable of forming during the reaction a compound which is at best only difficultly soluble in the solution from which a cation is to be removed, so that the thus formed compound will not be washed out of the column.

(2) After exhaustion of the ion-binding material, it must be possible to reconvert the thus formed difficultly soluble compound in a relatively simple manner into the sulfide of the metal thereof.

These conditions are primarily met by lead sulfide, iron sulfide and silver sulfide.

Lead remains in the material which is adapted to swell in contact with water, provided that the solution of the reaction, i.e., the solution containing the metal ion which is to be bound, also contains sulfate ions, or if an ammoniacalic solution is used.

When the more reactive FeS is used as the metal ion-binding metal sulfide, the solution should contain OH ions in order to achieve that the ion which is displaced from its sulfide, i.e., iron, will remain insoluble in the swellable carrier material.

Silver sulfide will remain in the hydrophilic carrier material in the form of insoluble compounds provided that chlorine ions or an excess of alkali are present. However, in view of its location in the replacement series, silver sulfide is only suitable for binding mercury and nobler metals.

$Pb(OH)_2$, $Fe(OH)_3$ and $Ag_2O$ react easily with hydrogen sulfide and sodium sulfide solutions, whereby the sulfides of lead, iron and silver are reconstituted. In this manner, it is possible to regenerate the ion-binding material repeatedly, until the limit of acceptance of the material for the precipitated metal sulfide, i.e. the sulfide of the cation which had to be removed from a solution thereof has been reached.

By regenerating with sodium sulfide solutions, small quantities of the metal sulfide will tend to form colloidal solutions. For this reason, it is more practical to regenerate with gaseous hydrogen sulfide, by blowing hydrogen sulfide through the column containing the ion-binding material, of course after withdrawal of the solution and washing out of dissolved ions. Hydrogen sulfide is blown through the column until the end of the regeneration is indicated by the passage of unreacted hydrogen sulfide through the entire column. Thereafter, the column is washed with water in the direction from its lower toward its upper end so as to preferably completely replace any air in the column with water, and until the column is freed of unreacted hydrogen sulfide. The thus treated column may be used again for the binding of metal ions. Preferably, at the upper end of the column a vacuum is applied in order to facilitate the filling of the column with water on cation-containing solution without retaining gas bubbles therein. Prolonged contact of the regenerated ion-binding material with air should be avoided in order to prevent oxidation of the metal sulfides therein, which, particularly in the case of ferrous sulfide, would take place rather quickly.

The reactions described above correspond substantially to the following four equations which will serve to illustrate the binding of metal ions by the sulfide-containing material and the regeneration of the material.

(1) $CuSO_4 + PbS \rightarrow CuS + PbSO_4$
(2) $PbSO_4 + Na_2S \rightarrow PbS + Na_2SO_4$
(3) $Cu(NH_3)_4SO_3 + FeS + H_2O \rightarrow CuS$
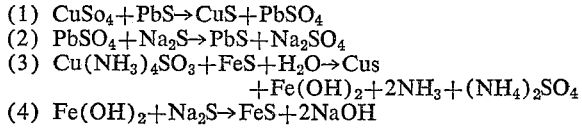
$+ Fe(OH)_2 + 2NH_3 + (NH_4)_2SO_4$
(4) $Fe(OH)_2 + Na_2S \rightarrow FeS + 2NaOH$ Equation 1 represents the reaction which takes place during the binding of copper from a dilute copper sulfate solution, using a lead sulfide-containing swellabev material. It will be seen that copper sulfide and lead sulfate are formed, the latter being insoluble under the reaction conditions. After the ion-binding material has been exhausted, it is regenerated by reacting the lead sulfate with sodium sulfide, while the copper sulfide remains in the material. During this reaction, as shown in Equation 2, lead sulfide and sodium sulfate are formed and the latter is then washed out so that the ion-binding materials now again will contain lead sulfide and thus will be ready to accept additional amounts of copper ions.

According to Equations 3 and 4, an iron sulfide-containing ion-binding material is used to retain copper from a copper ammonium sulfate solution. In this manner copper sulfide and iron hydroxide are formed. The regeneration of the iron hydroxide is then carried out with sodium sulfide so as to transform the iron hydroxide into iron sulfide, and the sodium sulfide into sodium hydroxide, the latter being washed out of the column. The copper sulfide which already has been deposited in the swellable material will remain therein and the now again iron sulfide-containing swellable material is capable of binding additional quantities of copper.

Use of lead sulfide as the metal ion-binding material is particularly indicated when such metal ions are to be removed from sulfate-containing waste waters. However, such solution must contain only relatively few H-ions, i.e. should have a pH of 3 or higher, since in the presence of stronger acid the capacity of the ion-binder upon repeated regeneration will be quickly reduced. Lead sulfide can be used only for the separation of copper, bismuth, silver, mercury and nobler metals.

The use of iron sulfide as the reactive sulfide has certain advantages as compared to the use of lead sulfide, particularly its greater reactivity, since with the help of iron sulfide also lead, cadmium, thallium, and to some extent zinc can be bound. The speed of reaction is greater so that in a given column a greater amount of metal ions-containing solution can be treated per unit of time. Since most metals such as silver, copper, lead, cadmium and zinc either form soluble amines, or alkali-soluble hydroxides, it is generally easily possible to comply with the requirement that an excess of hydroxyl ions should be present in the solutions which are to be treated with ion sulfide.

Instead of the above described regeneration of the metal ions-binding material, it is also possible to eluate the ion-binding materials after the same have been more or less fully charged with sulfides of the metal which had to be removed from a solution, in such a manner that after such elution the ion-binding material may be further used.

This can be accomplished in two ways, namely:

(1) The sulfides which are precipitated in the ion-binding material are dissolved with the exception of one, and the thus remaining sulfide may then be further used for binding metal ions.

(2) The eluating agent contains a suitable metal compound which will form an insoluble sulfide with the sulfide ions which are formed upon dissolution of the previously formed metal sulfide. The thus formed insoluble metal sulfide will remain in the swellable binder material and should be capable of reacting with further quantities of metal ion-containing solution.

The foregoing may be illustrated by the following equations:

(5) $2Pb(OH)_2 + 2CuS + 10NaCN + 2H_2O = 2PbS$
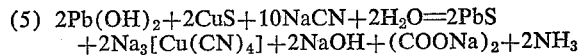
$+ 2Na_3[Cu(CN)_4] + 2NaOH + (COONa)_2 + 2NH_3$ (6) $2CuS + 2NaCN + 2NaOH + 2H_2O + 2Na_2[Pb(CN)_4]$
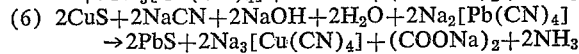
$\rightarrow 2PbS + 2Na_3[Cu(CN)_4] + (COONa)_2 + 2NH_3$ According to Equation 5 it is assumed that lead sulfide-containing ion-binding material was used to retain copper in alkaline solution. Thus, copper sulfide and lead hydroxide were formed. The exhausted ion binder is then washed with sodium cyanide solution, and thereby soluble sodium copper cyanide and lead sulfide are formed, so that the ion binder is reconstituted to its original condition. The simutlaneously formed sodium hydroxide, ammonia and sodium oxalate are washed out together with the sodium copper cyanide.

According to Equation 6 it is assumed that the ion binder, initially contained, for instance, iron sulfide and was used for separating copper from a copper sulfate solution. Thereby, soluble iron sulfate was formed and copper sulfide precipitated in the ion binder. If the ion binder would now be washed with sodium cyanide solution, the copper would be dissolved and no metal would be retained in the ion binder. For this reason, in this case, a water soluble lead compound is added to the wash solution so that soluble sodium copper cyanide and insoluble lead sulfide will be formed, in addition to ammonia and soluble sodium oxalate. Upon washing out the soluble compounds, the ion binder will contain lead sulfide and will be capable to retain such metal ions which are capable to displace the lead of the lead sulfide.

The method according to Equation 5 is perfectly suitable for lead-containing ion binding material. Compounds of copper, silver and gold are easily soluble in solutions of alkali metal cyanides (particularly in the presence of a small proportion of hydrogen peroxide), while in the presence of the sulfide ions formed during elution with sodium cyanide or the like, the lead compounds will be converted into lead sulfide which is insoluble in sodium cyanide. After such elution, the ion binding material can be used again.

According to Equation 6, the cyanide solution which is used for eluating the material contains lead, cadmium or zinc compounds so that sulfides thereof will be precipitated in the swellable material in place of the eluated compound.

Due to the fact that iron compounds form soluble complex compounds with cyanide, it is not possible to eluate iron sulfide-containing ion binding material in the above described manner. In the case of iron sulfide-containing materials, regeneration will preferably be carried out with sodium sulfide or hydrogen sulfide as described further above, and may be repeated until the volume of the ion binding material has been increased due to the accumulation of precipitated metal sulfides, to such an extent that the through flow speed of the metal ions-containing solution is unduly reduced. The working-up of such exhausted ion binding material can be carried out by dissolving the sulfides or by combustion of the material, of course in either case the material cannot be further used for its initial purpose.

It is a particular advantage of the ion binding materials according to the present invention that the same have a selective effect with respect to different cations which is independent of the type, quantity and valence of other cations which may be present in the metal ions-containing solution. The selectivity can be increased by suitably choosing the reacting sulfide in the metal ions binding material, in accordance with the replacement series described further above. Furthermore, due to the possibility of reactivating the ion binding material, without thereby dissolving the previously bound metal cation, it is possible to greatly increase the concentration of the bound cation in the ion binding material and thus to carry out the recovery of the thus bound cation under particularly advantageous conditions.

The following examples, like those appearing further above, are given as illustrative only of the present invention, without, however, limiting the invention to the specific details of the examples.

EXAMPLE XIII

A.—*Production of an iron sulfide-containing ion binder*

Arsenic trioxide is admixed to viscose in an amount equal to 8% of the alpha-cellulose of the viscose and thereafter fibers are spun thereof in conventional manner, having a titer of 7 denier. Upon subsequent treatment of the decomposed viscose fibers and cutting of the same into very short staple fibers, desulfurization and bleaching of the material is omitted.

The thus obtained yellow-colored staple fibers contain 4.78% arsenic trioxide and 2.80% sulfur in the form of $As_2S_3$ and $As_2S_5$.

20 g. of these arsenic-containing staple fibers are heated together with 10.4 grams of Mohr salt $$(NH_4)_2Fe(SO_4)_2 \cdot 6(H_2O)$$

and 20 grams sodium acetate ($CH_3COONa \cdot 3H_2O$) in between 800 and 1000 ml. of water, in the presence of a wetting agent, to a temperature of 70° C., whereupon a reaction takes place and the color of the fibers will change to black. During 30 minutes, under frequent stirring, the mixture is further heated from 70° C. to about 95° C. and thereafter maintained at boiling temperature for 10 minutes. Finally, the thus treated staple fibers are washed with water and subjected to a softening treatment, for instance, as described in the text "Chemiefasern" by K. Goetze, second edition, 1951, pages 572 to 612.

The thus treated fibers contain the equivalent of 4.59% $Fe_2O_3$. The moist material may be used immediately as binder for metal ions. However, if the material is dried because it is intended for use at some later time, it will be observed that the initially deep black fibers will change at least partially to a brown color thus indicating that the black FeS has been changed by oxidation due to contact with air to $Fe(OH)_3$.

20 g. of the thus produced dried staple fibers are moistened and treated in a glass tube, having a diameter of 20 mm., with a stream of hydrogen sulfide, until a cadmium solution contacted by gas leaving the glass tube will indicate that hydrogen sulfide passes from the glass tube into the cadmium solution. Thereupon passage of hydrogen sulfide through the glass tube which is filled with the moist staple fibers is continued for another 2 minutes and then suction is applied to the upper end of the glass tube while from the lower end thereof water is slowly allowed to flow into the tube. In this manner, it is achieved that the fibers-containing glass tube will be filled with water substantially free of gas bubbles. After washing of the thus formed fiber column until the spent wash water is free of hydrogen sulfide, the ion binding column is ready for use.

B.—*Binding of copper from a cuprammonium solution*

An aqueous n/10 solution of $(Cu(NH_3)_4)SO_4$ is passed through the thus prepared column until a blue color appears in the liquid leaving the column. The ion binding material is then washed until neutral.

The thus obtained column of neutral copper-containing material is regenerated with hydrogen sulfide as described further above and after washing so as to remove any free hydrogen sulfide may be reused for the binding of copper.

The iron sulfide will be transformed during the reaction with the alkaline copper solution into hydroxide and the iron hydroxide which remains in the ion binding material is then transformed by reaction with sodium sulfide or hydrogen sulfide into iron sulfide so that the ion binding material is reactivated.

The reactions which take place according to the present example are summarized in the following equations:

(7) $3(NH_4)_2Fe(SO_4)_2 + As_2S_3 + 6H_2O + 6CH_3COONa = 3FeS + 2H_3AsO_3 + 3(NH_4)_2SO_4 + 6CH_3COOH + 3Na_2SO_4$ (8) $2Fe(OH)_3 + 3H_2S = 2FeS + S + 6H_2O$ (9) $FeS + Cu(HN_3)_4SO_4 + 2H_2O = CuS + Fe(OH)_2 + (NH_4)_2SO_4 + 2NH_3$

Equation 7 indicates reaction of the arsenic sulfide-containing fiber with iron ammonium sulfate so as to obtain an iron sulfide-containing fiber. By buffering with sodium acetate the formated sulfuric acid is transformed into the softer acetic acid.

Equation 8 illustrates formation of iron sulfide from the iron hydroxide of the fiber.

Equation 9 shows how the iron sulfide will bind copper from ammoniacalic copper sulfate solution.

In the following Table I, the bound amount of copper and the capacity of the binder is given for up to 15 regenerations of the binder material.

TABLE I.—COPPER ACCEPTANCE BY IRON SULFIDE-CONTAINING REGENERATED CELLULOSE FIBERS IN RELATION TO THE NUMBER OF REGENERATING TREATMENTS

Amount of iron sulfide-containing fibers: 20 grams (dry basis).
Iron content of fibers: 3.22% Fe (as FeS).
Reaction temperature: 20° C.

| Number of Regeneration | Copper Bound, grams | Capacity of Binder Material, mval. per gram |
|---|---|---|
| 0 | 1.3126 | 2.066 |
| 1 | 1.4519 | 2.285 |
| 2 | 1.5060 | 2.370 |
| 3 | 1.8117 | 2.851 |
| 4 | 1.4684 | 2.311 |
| 5 | 1.4440 | 2.273 |
| 6 | 1.3417 | 2.112 |
| 7 | 1.3755 | 2.165 |
| 8 | 1.4718 | 2.316 |
| 9 | 1.4684 | 2.311 |
| 10 | 1.4862 | 2.339 |
| 11 | 1.4546 | 2.289 |
| 12 | 1.4486 | 2.280 |
| 13 | 1.4922 | 2.348 |
| 14 | 1.6982 | 2.673 |
| 15 | 1.5006 | 2.362 |

It will be seen that after 16 chargings of the ion binder material, 20 g. of iron sulfide-containing material will have absorbed 22.7 g. of copper which is more than the total weight of the ion-binding material, i.e. of the water swellable material, in this case regenerated cellulose staple fibers, plus the weight of the iron sulfide initially contained therein.

EXAMPLE XIV

A solution of 9.5% hydroxyethyl cellulose having a degree of substitution of 0.9 is produced in 7% aqueous sodium hydroxide. 3.78 g. $As_2O_3$ and 27.5 g. $Na_2S \cdot 9H_2O$ are dissolved in 70 ccm. of water and added to 200 g. of the solution of hydroxyethyl cellulose. The thus formed mixture is introduced in droplets into a coagulating bath containing 45% by volume of water, 46% by volume of methanol and 8% by volume of glacial acetic acid, the balance being sodium acetate. In this manner, small spherical bodies of hydroxyethyl cellulose are obtained which have a yellow color due to the arsenic sulfide contained therein. The spheres are then washed with water until the spent wash water is of a neutral reaction, and the thus obtained spheres can be used as the ion binding materials similar to the material described in Example XIII.

3.71 g. (dry weight) of the $As_2S_3$-containing and water-swollen spheres are then reacted with ferrous ions in order to be transformed into a FeS-containing material as described in Example XIII. Thereafter, as described in part (B) of Example XIII, the spheres are charged with a n/10 cuprammonium solution, regenerated with hydrogen sulfide and further treated as described in Example XIII. The amount of copper which can be bound after each regeneration remains practically constant and, in the case of 4 regenerations equals 837 mg., 841 mg., 800 mg. and 812 mg., corresponding to a capacity of 7 mval. per gram.

EXAMPLE XV

In Table II data are presented for the capacity of the iron sulfide-containing ion binder of Example XIII with respect to the binding of other metals, the ions of which are present in an alkaline solution.

TABLE II.—CAPACITY OF THE IRON-SULFIDE CONTAINING ION BINDER WITH RESPECT TO COMPLEX METAL COMPOUNDS

Reaction temperature: 20° C.

| Metal Complex | FeS-Containing Fibers (dry basis), grams | Iron-Content of Fibers, percent Fe | Metal Bound, grams | Capacity, mval./g. |
|---|---|---|---|---|
| $Cu(NH_3)_4^{2+}$ | 22.462 | 2.648 | 1.5329 Cu | 2.341 |
| $Ag(NH_3)_2^+$ | 22.92 | 3.222 | 2.712 Ag | 1.097 |
| $Pb(OH)_4^{2-}$ | 23.825 | 3.243 | 10.726 Pb | 4.345 |
| $Cd(NH_3)_4^{2+}$ | 23.43 | 3.074 | 1.700 Cd | 1.291 |
| $Zn(NH_3)_4^{2+}$ | 23.80 | 3.86 | 0.668 Zn | 0.859 |

EXAMPLE XVI

A.—*Production of a PbS-containing ion binder*

Arsenic sulfide-containing regenerated cellulose fibers produced as described in portion (A) of Example XIII are reacted with an excess of lead acetate solution, for 45 minutes at a temperature of between 90° and 95° C. and in a ratio of staple fibers to the bath equal to 1:50. The thus treated staple fibers contain 13.51% lead.

B.—*Binding of copper from a cuprammonium solution*

25 g. (dry weight) of the thus obtained PbS-containing fibers are used in the manner described in Example XIII for binding copper from a n/10 $Cu(NH_3)_4^{2+}$ solution. After saturation of the staple fibers, the same are regenerated with hydrogen sulfide and again charged with $Cu^{2+}$. After 5 chargings with $Cu^{2+}$, the material is eluated with a solution of 30 g. of NaCN and 60 g. $Na_2S \cdot 9H_2O$ in 410 ccm. of $H_2O$, whereby CuS will be decomposed, the copper will go into solution as $Na_3(Cu(CN)_4)$ while lead will remain in the fibers in the form of PbS. After 5 further chargings and regenerations, the material is again eluated with the sodium cyanide-sodium sulfide solution, and this sequence of reactions is repeated as desired.

The amount of copper which is bound in each of the binding steps and the amount of copper eluated in each of the eluating steps are indicated in Table III.

Elution of the ion binder after every 5 charges is chosen arbitrarily in order to be able to determine the capacity of the material after several elutions and thereby its practical usefulness as an ion binder.

TABLE III.—COPPER TAKEN UP BY LEAD SULFIDE-CONTAINING FIBERS IN RELATION TO THE NUMBER OF REGENERATIONS AND ELUTIONS

Amount of lead sulfide-containing fibers: 25 grams (dry basis)
Lead content of fibers: 13.51% Pb (as PbS)
Reaction temperature: 20°C.

| Number of Regenerations | Copper Bounds, grams | Capacity of Binder Material, mval. per gram | Copper Bound, grams (cumulative) | Copper Eluated, grams |
|---|---|---|---|---|
| 0 | 1.1638 | 1.465 | 1.1638 | |
| 1 | 1.3992 | 1.762 | 2.5630 | |
| 2 | 1.4196 | 1.787 | 3.9826 | |
| 3 | 1.6438 | 2.070 | 5.6264 | |
| 4 | 1.6933 | 2.132 | 7.3197 | 7.1880 |
| 5 | 1.6178 | 2.037 | 1.6178 | |
| 6 | 1.8875 | 2.376 | 3.5053 | |
| 7 | 1.8940 | 2.385 | 5.3993 | |
| 8 | 1.8664 | 2.350 | 7.2657 | |
| 9 | 1.9045 | 2.398 | 9.1702 | 9.0076 |
| 10* | 1.4477 | 1.823 | 1.4477 | |
| 11 | 1.5648 | 1.970 | 3.0125 | |
| 12 | 1.6140 | 2.032 | 4.6265 | |
| 13 | 1.5780 | 1.987 | 6.2045 | |
| 14 | 1.6560 | 2.085 | 7.8605 | 7.7800 |

The second elution was carried out in the presence of 30 grams per liter of NaOH. This resulted in very strong swelling of the material causing a reduction of the capacity of the same after the second elution, indicated by an asterisk at the tenth regeneration. Thereafter, the capacity started to rise again.

It can be seen that after 15 charges the ion binding material is still as active as at the beginning and that during these 15 charges the total amount of bound copper (24.35 g. copper) substantially equals the weight of the ion binding material. Provided that the eluating liquid does not cause severe swelling of the material, the capacity of the binder will not be impaired by elution thereof. The precipitated copper sulfide is practically completely dissolved during the eluating steps. As indicated in Table III, it has been found that the capacity of the ion binding material increases upon repeated charging although no clear theoretical explanation for this phenomenon is offered at this time.

The method described in the example above is well suited for working-up waste waters of the copper-rayon manufacture.

EXAMPLE XVII

*Recovery of silver from spent photographic fixing baths*

Per liter of a spent photographic fixing bath, 20 cm.³ of concentrated ammonia are added and the thus formed solution is passed through an ion binder column containing 25 g. of the lead sulfide-containing fiber material described in Example XVI (A). Passage of the fixing bath through the column is terminated as soon as the liquid leaving the column is found to contain silver. The ion binder material in the column is then washed to neutrality and thereafter regenerated with hydrogen sulfide and again charged with the fixing bath solution. During the first charging, 2.924 g. silver (capacity 1.084 mval. per gram) were bound, and during the second charging 3.3111 g. (capacity 1.228 mval. per gram).

Here again it is found that the capacity of the ion binder increased after regeneration, similarly to what has been found in Example XVI.

EXAMPLE XVIII

*Binding of copper and silver from neutral and acidic sulfuric acid-containing solutions with lead sulfide*

An $n/10$ copper sulfate solution and a $n/10$ silver sulfate solution are passed over 20 grams of lead sulfide-containing fibers produced as described in Example XVI (A). In two tests, the solutions are passed through the column filled with the lead sulfide-containing fibers once in neutral state and once in the presence of $n/20$ sulfuric acid. After saturation of the ion binder material, the fibers are regenerated and again reacted with the copper and silver solutions. The respective capacities of the ion binder material will be seen from Table IV.

TABLE IV

Amount of fibers: 20 grams (dry basis)
Lead content of fibers: 13.51% Pb (as PbS)
Theoretical capacity: 1.3 mval. per gram
Reaction temperature: 20° C.

| Metal Solution | Number of charges | | |
|---|---|---|---|
| | 1 | 2 | 3 |
| n/10 CuSO₄: | | | |
| Mg. Cu bound | 568 | 329 | 295 |
| Capacity mval./g | 0.90 | 0.52 | 0.46 |
| n/10 CuSO₄+n/20 H₂SO₄: | | | |
| Mg. Cu bound | 520 | 278 | 244 |
| Capacity mval./g | 0.82 | 0.44 | 0.38 |
| n/10 Ag₂SO₄: | | | |
| Mg. Ag bound | 3,515 | 2,885 | 2,416 |
| Capacity mval./g | 1.63 | 1.34 | 1.12 |
| n/20 Ag SO+n/20 H₂SO₄: | | | |
| Mg. Ag bound | 3,561 | 2,777 | 1,987 |
| Capacity mval./g | 1.65 | 1.29 | 0.92 |

The capacity of the lead sulfide-containing ion binder with respect to $Cu^{2+}$ is smaller in a neutral pH range than in an ammoniacal solution. In the presence of sulfuric acid (pH of about 2) the capacity of the binder with respect to the binding of copper and silver is further reduced by about 10 to 15%.

Contrary to the reactions which occur in an ammoniacal medium, the capacity of the lead sulfide ion binder, when operating in a neutral or acidic range, will be reduced upon regeneration of the ion binder.

EXAMPLE XIX

*Binding of silver with zinc sulfide*

10 g. of dry zinc sulfide fibers, containing 6.02% zinc in the form of zinc sulfide and located in a glass tube, are used for binding silver from an $n/25$ silver nitrate solution. After washing out of the silver nitrate, the binder column is eluated with sodium-cadmium cyanide solution which, for catalyzing the reaction, contains a small proportion of hydrogen peroxide. The eluating solution is composed as follows:

15.66 grams per liter NaCN
8.0 grams per liter NaOH
8.5 grams per liter $Cd(CH_3COO)_2 \cdot 2H_2O$
5 cm.³ per liter $H_2O_2$ (30%)

To the extent to which silver sulfide is dissolved and cadmium is precipitated, the color of the initially black fibers will change to yellow. After washing out of the eluating liquid, the fibers can be charged again with silver nitrate solution.

The amount of silver which is taken up after several elutions is indicated in Table V.

TABLE V

Amount of zinc sulfide-containing fibers: 10 grams (dry basis)
Zinc content of fibers: 6.02% Zn (as ZnS)
Theoretical capacity: 1.84 mval. per gram

| Number of Elutions | Silver Bound (mg.) | Capacity (mval./g.) |
|---|---|---|
| 0 | 1,792 | 1.66 |
| 1 | 1,742 | 1.61 |
| 2 | 1,575 | 1.46 |
| 3 | 1,537 | 1.42 |
| 4 | 1,535 | 1.42 |
| 5 | 1,412 | 1.31 |
| 6 | 1,335 | 1.24 |
| 7 | 1,291 | 1.20 |
| 8 | 1,216 | 1.13 |

EXAMPLE XX 25 g. of dry, zinc sulfide-containing regenerated cellulose having incorporated therein 6.02% of zinc in the form of zinc sulfide, are treated with an excess of $n/10$ copper sulfide, solution. 1331 mg. of copper are precipitated as copper sulfide, corresponding to a capacity of 1.68 mval./g. Thereafter, the binder material is eluated with a solution which contains 20 grams per liter of

$$Zn(CH_3COO)_2 \cdot 2H_2O$$

9 grams per liter NaCN and 50 cm.³ per liter of concentrated ammonia (density 0.91).

The initially black color of the cellulose will change thereby to a dirty grayish appearance. Upon renewed charging with $n/20$ $CuSO_4$, 840 mg. copper are bound. Thus, after regeneration, the capacity of the binder was dropped to 1.06 mval./g.

EXAMPLE XXI

*Separation of silver, copper, cadmium and nickel by selective binding of the same*

By reacting 10 g. each of dry, arsenic sulfide-containing regenerated cellulose fibers with $Cu^{2+}$, $Pb^{2+}$ and $Fe^{2+}$, three different ion binders are produced and 3 columns are then respectively charged therewith and arranged in the sequence CuS-PbS-FeS, so that the solution from which metal ions are to be removed will pass through all 3 columns in the indicated sequence. The thus arranged series of ion binding columns is then charged with an ammoniacal solution of 0.8 grams $AgNO_3$, 1.2 grams $CuSO_4 \cdot 5H_2O$, 1.25 grams $Cd(CH_3COO)_2 \cdot 2H_2O$ and 1.3 grams $NiSO_4 \cdot 7H_2O$, and washed after passage of the solution through the series of columns has been completed.

The solution leaving the copper sulfide column is free of silver, however, it does contain copper, cadmium and nickel. The solution leaving the lead sulfide column is free of copper but contains cadmium and nickel. The solution leaving the iron sulfide column is free of cadmium but gives a positive qualitative nickel test.

In this manner it is thus possible to quantitatively separate the four metallic components of the solution.

If the copper sulfide-containing binder material which serves for binding silver contains also lead hydroxide, which can be accomplished by reacting lead sulfide-containing fibers with $(Cu(NH_3)_4)^{2+}$, then it is possible to regenerate the binder material in such a manner that after exhaustion of the material, the $Pb(OH)_2$ of the same is converted into PbS, and the binder material is then again treated with $(Cu(NH_3)_4)^{2+}$. The copper sulfide formed thereby may serve for binding additional silver ions.

As described further above, the amount of arsenic trioxide or other arsenic or antimony compounds which is initially incorporated in the fibers or the like should not exceed about 15% of the weight of the alpha cellulose, since fibers having a higher arsenic or antimony compound content will not possess the desired strength during the spinning process and will be of inferior quality.

However, the percentage amount of arsenic or antimony sulfide in the fiber will control the amount of heavy metal sulfide which can be incorporated in the fiber by reacting the antimony or arsenic sulfide-containing fiber with heavy metal salts.

According to a further embodiment of the present invention, it is possible to obtain shaped bodies of regenerated cellulose which contain a considerably higher percentage amount of heavy metals, particularly heavy metal sulfides, by treating the arsenic or antimony sulfide-containing bodies of regenerated cellulose first with aqueous solutions of lead or iron salts, which salts preferably contain bivalent lead or iron, thereafter reacting the thus obtained iron or lead sulfide-containing bodies of regenerated cellulose in the presence of hydroxyl ions with salts of other heavy metals which in an alkaline medium have a greater affinity to sulfide ions than iron or lead, and finally converting the thereby formed difficultly soluble iron or lead hydroxides with the help of sulfide ions into iron or lead sulfide. This sequence of reactions can be repeated as often as desired in order to obtain in the regenerated cellulose body the desired accumulation of a high percentage amount of the sulfide of a metal or metals which, in an alkaline medium, possess a greater affinity to sulfide ions than lead or iron.

In this manner it is possible, even by limiting the initial content of the regenerated cellulose fibers to between about 8 and 10% by weight of arsenic or antimony sulfide, to produce fibers containing 50% by weight and more of heavy metal compound. It is advantageous to react with the lead sulfide or iron sulfide-containing regenerated cellulose, salts of such heavy metals which form hydroxides of amphoteric characteristics, such as cadmium, zinc, copper or silver.

It is advantageous to use amphoteric metal hydroxides because the same will dissolve under formation of soluble complex compounds, either in the presence of excess ammonia or in the presence of excess alkali. These complex metal compounds will then easily react as required according to the present invention.

Non-amphoteric metal hydroxides will precipitate as difficulty soluble compounds when the pH rises to above between 6.5 and 7.0. It is therefore generally preferred to operate in an alkaline medium so that the hydroxide of the first applied heavy metal, which is at first present in the form of its sulfide, will be retained in the fibers and can be regenerated therein to again form the sulfide.

As described further above, the reaction is preferably carried out in an ammoniacalic solution, whereby the complex amines of the above mentioned metals have been found particularly suitable. As described further above, the reaction may be carried out at elevated temperatures, for instance, at boiling temperature, whereby the stability of the amine complex at elevated temperature can be assured by the suitable choice of an organic amine such as ethylenediamine or diethylenetriamine. After completion of the reaction, the regenerated cellulose will contain the difficultly soluble hydroxides of lead or iron which can be regenerated to their sulfides by treatment with gaseous hydrogen sulfide or a solution containing sulfide ions. These reactions, including regeneration of the lead or iron hydroxide to the respective sulfide, can be repeated as often as necessary until the regenerated cellulose contains the desired percentage amount of heavy metal sulfides.

In the case of the $(Ag(NH_3)_2)^+$-complex, at least four equivalents of $NH_3$ are required for each equivalent of $Ag^+$ in order to obtain solutions which are stable at 80–90° C. Generally, at least twice the stoichiometrically required amount of $NH_3$ is to be applied, and preferably the amount of $NH_3$ will be between 2.5 and 3 times the stoichiometrically required amount, or the proportion of $NH_3$ may be even greater.

In connection with these reactions it has to be taken into consideration that due to the relative degree of affinity of the sulfide ion to different metals in the alkaline or ammoniacalic range, lead sulfide can be reacted only with mercury, silver and copper salts under formation of lead hydroxide, while iron sulfide can be additionally reacted with salts of lead, tin, cadmium, cobalt, nickel and zinc.

It is again advantageous to use for the reaction buffer salts formed of strong bases with weak acids, for instance, sodium acetate. The hydrolytic decomposition of the buffer salts can be increased by raising the temperature. The heavy metals which are to be incorporated into the regenerated cellulose in the form of their sulfides may advantageously be introduced in the form of their acetates. In order to avoid during such reaction with an iron sulfide-containing regenerated cellulose the loss of iron due to formation of soluble iron salts, it is preferred to react the heavy metal acetates in the presence of at least equimolecular amounts or equivalent amounts of alkali metal acetate.

The last described method permits the recovery of shaped bodies of regenerated cellulose which have a pigment or heavy metal sulfide content of a magnitude which cannot be obtained according to any other methods known to us. The thus obtained products are highly fast to washing. However, these new products have hydrophobic characteristics and it is therefore frequently desirable to utilize wetting agents, particularly during the last stages of the process.

According to a preferred embodiment, the arsenic sulfide or antimony sulfide-containing fibers or threads are first worked up to woven or knitted fabrics or to unwoven fabrics such as fiber fleece, and only the thus formed textile materials are then reacted with the heavy metal compounds. In this maner, it is avoided that fibers of high pigment content are exposed to the mechanical stress connected with forming fabrics thereof.

Fabrics according to the present invention, formed of fibers or the like containing a high percentage of pigments, i.e. heavy metal sulfides, can be advantageously used for wearing apparel offering protection against high-energy radiation.

EXAMPLE XXII

A yarn spun of staple fibers of 2.75 denier and 40 mm. length consisting of regenerated cellulose containing 14.5% by weight of lead sulfide is woven into a fabric.

Sizing is removed from the thus obtained lead sulfide-containing fabric by boiling with wetting agent-containing water, and the fabric is then reacted at a temperature of between 70 and 80° C. with an aqueous solution of $Ag(NH_3)_2NO_3$, whereby care should be taken that the bath always contains excess silver. A suitable wetting agent is, for instance, P-isodecyl-benzene sulfonate. The pH of the aqueous silver diamine nitrate solution is preferably maintained at between 11 and 12. The maximum pH value of the solution is 14 and the minimum 11. It is preferred to use a reaction solution which has a pH of 11.4 when determined at a temperature of 20° C. The reaction is permitted to continue for about one hour. Thereafter, the fabric is rinsed with cold water until no more silver is removed, and then treated for 15 minutes at room temperature with a saturated aqueous solution of hydrogen sulfide, rinsed until no more hydrogen sulfide is removed, and—without intermediate drying—the fabric is then again reacted at 70–80° C. with $Ag(NH_3)_2NO_3$.

After repeating the treatment five times, the fabric contains 11.4% PbS and 21.5% $Ag_2S$, after ten treatments: 9.8% PbS and 32.4% $Ag_2S$, and after thirteen treatments: 8.7% PbS and 39.8% $Ag_2S$. The thus treated, dried fabric which retains its textile characteristics, contains 48.5% of inorganic material in the form of PbS and $Ag_2S$ and has hydrophobic characteristics.

EXAMPLE XXIII

A latex bound carded fleece formed in conventional manner of staple fibers of regenerated cellulose of 2.75 denier and 40 mm. length, and containing 14.5% PbS, is reacted 19 times with $Ag(NH_3)_2$-salt and each time regenerated with hydrogen sulfide-containing water. The pH of the reaction solution is maintained between 11 and 14, preferably between 11 and 12, and most preferably at 11.4 when determined at a temperature of 20° C. The thus obtained fleece which maintains its textile characteristics, contains 5.85% PbS and 59.7% $Ag_2S$, a total of 65.55% of inorganic substance.

EXAMPLE XXIV

After removing the sizing from a fabric formed of staple fibers of regenerated cellulose, 2.75 denier, 40 mm. long, and containing 2.5% $As_2S_3$, the fabric is reacted, in the presence of a small amount of ascorbic acid in order to reduce oxidation, at a temperature of between 90 and 95° C., with an aqueous solution containing an excess of bivalent iron salt and between 2 and 4 times the equivalent amount of sodium acetate. The pH of the solution preferably is maintained between 6.1 and 6.5, when determined at 20° C. The reaction is continued for 90 minutes and preferably carried out in a dye beck or the like. The thus obtained deep black fabric which contains 2% FeS is washed with cold water until free of excess bivalent iron ions.

A bath containing $Pb(CH_3COO)_2$, and per mol of lead salt 2 mols of sodium acetate, is preheated to between 95 and 98° C. The FeS-containing fabric is then treated in this bath for 30 minutes.

Thereafter, excess lead is removed from the fabric by washing with cold water and the $Fe(OH)_3$ which has precipitated within the cross section of the fiber is regenerated to FeS by treatment with cold hydrogen sulfide-containing water. The fabric is then washed so as to be freed of excess hydrogen sulfide, and the process is repeated several times starting with the lead acetate treatment.

A fabric of anthracite grey color is obtained which, after five repetitions of the process contains 21.4% PbS and 1.9% $Fe(OH)_3$, after ten repetitions: 31.2% PbS and 1.5% $Fe(OH)_3$, and after fifteen repetitions 42.1% and 1.4% $Fe(OH)_3$.

If the last repeated reaction is carried out with a solution of $Pb(NO_3)_2$, a fabric will be obtained which contains 42.5% PbS and is practically free of iron compounds. After drying, the PbS-containing fabric displays hydrophobic properties without losing its textile characteristics.

EXAMPLE XXV

The sizing is removed from a fabric formed of staple fibers of 2.75 denier and 40 mm. length, consisting of regenerated cellulose containing 12.2% $As_2S_3$. The fabric is then reacted at between 90 and 95° C. for 90 minutes with a solution of excess $FeSO_4$, in the presence of between two and four times the equivalent amount of sodium acetate, and also the presence of a small amount of ascorbic acid. In this manner a deep black fabric is obtained containing 10.5% FeS which is now reacted, without intermediate drying, for a period of 90 minutes, at a temperature of between 95 and 98° C., with a preheated aqueous solution of $Zn(CH_3COO)_2$ which contains 2 mols of sodium acetate for each mol of zinc acetate. Thereafter, the fabric is washed until free of excess zinc, the iron hydroxide is regenerated with hydrogen sulfide to FeS, and this process repeated in a manner similar to that described in Example XXIV. After repeating the process five times, the fabric will contain 36.7% ZnS and 8.0% $Fe(OH)_3$.

If the zinc acetate which is used for reaction with the iron sulfide-containing fabric is replaced by $$Cd(CH_3COO)_2$$

it will be found that upon repeating the process five times, the fabric will contain 46.2% CdS and 6.8% $Fe(OH)_3$.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of the following claims.

What is claimed as new and desired to be secured by Letters Patent is:

1. A method of producing a metal sulfide-containing shaped body of regenerated cellulose, comprising the steps of extruding into an acid bath viscose having dissolved therein a compound selected from the group consisting of thioarsenite, thioarsenate, thioantimonite and thioantimonate so as to form a shaped body of regenerated cellulose containing a sulfide of at least one chemical element selected from the group consisting of arsenic and antimony; and treating the thus formed shaped body with a water soluble salt of a metal having a greater affinity to ionic sulfide radicals than said chemical element, and the sulfide of which is at most slightly soluble in water, so as to replace said chemical elements of the sulfide contained in said shaped body of regenerated cellulose with said metal, thereby forming a shaped body of regenerated cellulose having distributed therethrough the sulfide of said metal.

2. A method of producing a metal sulfide-containing shaped body of regenerated cellulose, comprising the steps of mixing into viscose a compound soluble in said viscose and selected from the group consisting of the oxides, chlorides, bromides and iodides of at least one chemical element selected from the group consisting of arsenic and antimony; extruding said viscose having said compound dissolved therein into an acid bath so as to form without alkaline after-treatment a shaped body of regenerated cellulose containing the sulfide of said chemical element formed by reaction of said compound with said viscose; and treating the thus formed shaped body with a solution of a water soluble salt of a metal having a greater affinity to ionic sulfide radicals than said chemical element and the sulfide of which is at most slightly soluble in water so as to replace in said shaped body of regenerated cellulose said chemical element with said metal, thereby forming a shaped body of regenerated cellulose having incorporated therein the sulfide of said metal.

3. A method of producing a metal sulfide-containing shaped body of regenerated cellulose, comprising the steps of mixing into viscose a compound including as a constituent thereof a chemical element selected from the group consisting of arsenic and antimony, said compound being soluble in said viscose with attendant formation of a viscose-soluble sulfide; extruding said viscose having said compound dissolved therein into an acid bath so as to form without alkaline after-treatment a shaped body of regenerated cellulose containing the sulfide of said chemical element formed by reaction of said compound with said viscose; and treating the thus formed shaped body with a solution of a water soluble salt of a metal having a greater affinity to ionic sulfide radicals than said chemical element and the sulfide of which is at most slightly soluble in water, said metal being selected from the group consisting of copper, lead, mercury, silver, platinum, gold, tin, bismuth, iron, cobalt, nickel, zinc and cadmium so as to replace in said shaped body of regenerated cellulose said chemical element with said metal, thereby forming a shaped body of regenerated cellulose having incorporated therein the sulfide of said metal.

4. A method of producing a shaped body of regenerated cellulose as defined in claim 3, wherein said treating of said shaped body with a solution of a water soluble salt of a metal having a greater affinity to ionic sulfide radicals than said chemical element and the sulfide of which is at most slightly soluble in water is carried out at an elevated temperature of up to 100° C.

5. A method according to claim 3, wherein said treatment with a solution of a salt of silver, copper, cadmium, zinc, cobalt and nickel is carried out in the presence of an organic amine and in a pH range of between 8 and 14.

6. A method according to claim 3, wherein said treatment with a solution of a salt of silver, copper, cadmium, zinc, cobalt and nickel is carried out in the presence of an organic amine and in a pH range of between 7.5 and 10.

7. A method of producing a metal sulfide-containing shaped body of regenerated cellulose, comprising the steps of mixing into viscose a compound including as a constituent thereof a chemical element selected from the group consisting of arsenic and antimony, said compound being soluble in said viscose with attendant formation of a viscose-soluble sulfide the quantity of said compound not exceeding about 15% of the weight of the alpha cellulose contained in said viscose; extruding said viscose having said compound dissolved therein into an acid bath so as to form without alkaline after-treatment a shaped body of regenerated cellulose containing the sulfide of said chemical element formed by reaction of said compound with said viscose; and treating the thus formed shaped body with a solution of a water soluble salt of a metal having a greater affinity to ionic sulfide radicals than said chemical element and the sulfide of which is at most slightly soluble in water so as to replace in said shaped body of regenerated cellulose said chemical element with said metal, thereby forming a shaped body of regenerated cellulose having incorporated therein the sulfide of said metal.

8. A method of producing a metal sulfide-containing shaped body of regenerated cellulose, comprising the steps of dissolving arsenic trioxide in viscose in an amount equal to up to 15% of the weight of the alpha cellulose contained in said viscose; extruding said viscose having said arsenic trioxide dissolved therein into an acid bath so as to form without alkaline after-treatment a shaped body of arsenic sulfide-containing regenerated cellulose; and treating the thus formed shaped body with an aqueous solution of a water soluble salt of a metal selected from the group consisting of copper, lead, mercury, silver, platinum, gold, tin, bismuth, iron, cobalt, nickel, zinc and cadmium, so as to replace in said shaped body of regenerated cellulose the arsenic of said arsenic sulfide with said metal, thereby forming a shaped body of regenerated cellulose having incorporated therein the sulfide of said metal.

9. A method of producing a shaped body of regenerated cellulose, comprising the steps of mixing into viscose a compound including as a constituent thereof a chemical element selected from the group consisting of arsenic and antimony, said compound being soluble in said viscose with attendant formation of a viscose-soluble sulfide; extruding said viscose having said compound dissolved therein into an acid bath so as to form without alkaline after-treatment a shaped body of regenerated cellulose containing the sulfide of said chemical element formed by reaction of said compound with said viscose; treating the thus formed shaped body with a solution of a water sluble salt of a first metal having a greater affinity to ionic sulfide radicals than said chemical element and the sulfide of which is at most slightly soluble in water so as to replace in said shaped body of regenerated cellulose said chemical element with said metal; and treating the shaped body of regenerated cellulose containing the sulfide of said first metal with a water soluble salt of a second metal having a greater affinity to sulfur than said first metal and the sulfide of which is at most slightly soluble in water, so as to replace in said body said first metal with said second metal, thereby forming a shaped body of regenerated cellulose having the sulfide of said second metal incorporated therein.

10. A method of producing a shaped body of regenerated cellulose, comprising the steps of mixing into viscose a compound including as a constituent thereof a chemical element selected from the group consisting of arsenic and antimony, said compound being soluble in said viscose with attendant formation of a viscose-soluble sulfide; extruding said viscose having said compound dissolved therein into an acid bath so as to form without alkaline after-treatment a shaped body of regenerated cellulose containing the sulfide of said chemical element formed by reaction of said compound with said viscose; and treating the thus formed shaped body with a solution of a water soluble salt of a metal having a greater affinity to ionic sulfide radicals than said chemical element and the sulfide of which is stable within an alkaline pH range and at most slightly soluble in water so as to replace in said shaped body of regenerated cellulose said chemical element with said metal, thereby forming a shaped body of regenerated cellulose having incorporated therein the sulfide of said metal and being adapted to be further reacted with metal-containing compounds within an alkaline pH range.

11. A method of producing a shaped body of regenerated cellulose, comprising the steps of mixing into a viscose having a pigment distributed therethrough a compound including as a constituent thereof a chemical element selected from the group consisting of arsenic and antimony, said compound being soluble in said viscose with attendant formation of a viscose-soluble sulfide; extruding said viscose having said compound dissolved therein into an acid bath so as to form without alkaline after-treatment a shaped body of regenerated cellulose containing the sulfide of said chemical element formed by reaction of said compound with said viscose; and treating the thus formed shaped body with a solution of a water soluble salt of a metal having a greater affinity to ionic sulfide radicals than said chemical element and the sulfide of which is at most slightly soluble in water, so as to replace in said shaped body of regenerated cellulose said chemical element with said metal, thereby forming a shaped body of regenerated cellulose having incorporated therein the sulfide of said metal.

12. A method of producing a shaped body of regenerated cellulose, comprising the steps of mixing into viscose a compound being soluble in said viscose and including as a constituent thereof a chemical element selected from the group consisting of arsenic and antimony, said compound being soluble in said viscose with attendant formation of a viscose-soluble sulfide; extruding said viscose having said compound dissolved therein into an acid bath so as to form without alkaline after-treatment a shaped body of regenerated cellulose containing the sulfide of said chemical element formed by reaction of said compound with said viscose; treating the thus formed shaped body with a solution of a water soluble salt of a metal selected from the group consisting of lead and iron so as to replace in said shaped body of regenerated cellulose said chemical element with said metal; further treating said body of regenerated cellulose in the presence of hydroxyl ions with a salt of a heavy metal having in alkaline solution a greater affinity to ionic sulfide radicals than said metal so as to form in said regenerated cellulose the sulfide of said heavy metal and the hydroxide of said metal; further treating said body of regenerated cellulose with a sulfide ions-containing solution so as to reconvert said hydroxide of said metal to the sulfide of said metal; and repeating in the indicated sequence the steps of treating said body of regenerated cellulose with a salt of said heavy metal, and with sulfide ions-containing solution until the desired concentration of the sulfide of said heavy metal in said body of regenerated cellulose is reached.

13. A method of producing a shaped body of regenerated cellulose, comprising the steps of mixing into viscose a compound including as a constituent thereof a chemical element selected from the group consisting of arsenic and antimony, said compound being soluble in said viscose with attendant formation of a viscose-soluble sulfide; extruding said viscose having said compound dissolved therein into an acid bath so as to form without alkaline after-treatment a shaped body of regenerated cellulose containing the sulfide of said chemical element formed by reaction of said compound with said viscose; treating the thus formed shaped body with a solution of a water soluble iron salt so as to replace in said shaped body of regenerated cellulose said chemical element with iron; further treating said body of regenerated cellulose in the presence of hydroxyl ions with a salt of a heavy metal selected from the group consisting of mercury, silver, copper, lead, tin and cadmium so as to form in said regenerated cellulose the sulfide of said heavy metal and the hydroxide of iron; further treating said body of regenerated cellulose with a sulfide ions-containing solution so as to reconvert said iron hydroxide to iron sulfide; and repeating in the indicated sequence the steps of treating said body of regenerated cellulose with a salt of said heavy metal, and with sulfide ions-containing solution until the desired concentration of the sulfide of said heavy metal in said body of regenerated cellulose is reached.

14. A method of producing a shaped body of regenerated cellulose, comprising the steps of mixing into viscose a compound including as a constituent thereof a chemical element selected from the group consisting of arsenic and antimony, said compound being soluble in said viscose with attendant formation of a viscose-soluble sulfide; extruding said viscose having said compound dissolved therein into an acid bath so as to form without alkaline after-treatment a shaped body of regenerted cellulose containing the sulfide of said chemical element formed by reaction of said compound with said viscose; treating the thus formed shaped body with a solution of a water soluble lead salt so as to replace in said shaped body of regenerated cellulose said chemical element with lead; further treating said body of regenerated cellulose in the presence of hydroxyl ions with a salt of a heavy metal selected from the group consisting of mercury, silver, and copper so as to form in said regenerated cellulose the sulfide of said heavy metal and the hydroxide of lead; further treating said body of regenerated cellulose with a sulfide ions-containing solution so as to reconvert said lead hydroxide to lead sulfide; and repeating in the indicated sequence the steps of treating of said body of regenerated cellulose with a salt of said heavy metal, and with sulfide ions-containing solution until the desired concentration of the sulfide of said heavy metal in said body of regenerated cellulose is reached.

References Cited
UNITED STATES PATENTS

| | | | |
|---|---|---|---|
| 1,332,974 | 3/1920 | Dennison | 8—52 X |
| 1,332,982 | 3/1920 | Gibbons | 8—52 X |
| 1,633,621 | 6/1927 | Blumenfeld | 210—53 |
| 2,280,590 | 4/1942 | Krchma | 23—135 |
| 2,364,407 | 12/1944 | Walker | 210—53 X |
| 2,376,467 | 5/1945 | Wilson | 252—316 |
| 2,755,172 | 7/1956 | McGauley et al. | 23—135 X |

ALEXANDER H. BRODMERKEL, *Primary Examiner.*

ALFRED L. LEAVITT, DONALD J. ARNOLD,
*Examiners.*

J. H. WOO, *Assistant Examiner.*